United States Patent Office 2,857,340
Patented Oct. 21, 1958

2,857,340

STEEPING METHOD FOR PREPARING FOAMABLE STYRENE POLYMER PARTICLES CONTAINING A RUBBERY DIENE POLYMER

Robert E. Colwell, Springfield, Mass., assignor to Monsanto Chemical Company, St. Louis, Mo., a corporation of Delaware No Drawing. Application December 28, 1955
Serial No. 555,760

3 Claims. (Cl. 260—2.5)

The present invention relates to a method for preparing foamable styrene polymer particles. More particularly, the present invention relates to an improved process for preparing foamable styrene polymer particles by steeping styrene polymer particles in a volatile aliphatic hydrocarbon.

Styrene polymer foams constitute a valuable class of materials which are finding increasingly wide application in the fabrication of numerous industrial and consumer articles such as life belts, insulation partitions, novelties, etc. A leading method for fabricating such foams involves placing small particles of a foamable styrene polymer in a mold and heating to foam the styrene polymer particles which fuse together to form a unitary structure. One method for preparing foamable styrene polymer particles comprises steeping styrene polymer particles in a volatile aliphatic hydrocarbon such as pentane, petroleum ethers, etc. until the styrene polymer particles have absorbed the desired quantity of the hydrocarbon, e. g., 5–10 weight percent. This process is extremely time consuming and up to 30 days may be required to absorb a sufficient quantity of the volatile aliphatic hydrocarbon, cf. Example 5 of U. S. 2,681,321. Moreover, the styrene polymer foams prepared from such foamable styrene polymer particles frequently are not as homogeneous as desired and may have an undesirably large cell size.

It is an object of this invention to provide an improved method for incorporating a volatile aliphatic hydrocarbon in styrene polymer particles.

Another object of this invention is to provide novel foamable styrene polymer particles having a volatile aliphatic hydrocarbon homogeneously incorporated therein.

Other objects and advantages of this invention will become apparent from the following detailed description thereof.

In accordance with the present invention foamable styrene polymer particles are prepared by incorporating from about 1 part to about 20 parts of a rubbery diene polymer in 100 parts of a styrene polymer, comminuting the polymer composition into small particles and steeping said particles in a volatile aliphatic hydrocarbon boiling in the range of from about 10° C. to about 80° C. The rubbery diene polymer incorporated in the styrene polymer is selected in the class consisting of natural rubber, homopolymers of conjugated 1,3 dienes and interpolymers of conjugated 1,3 dienes containing at least 30 weight percent of said diene. Surprisingly, the styrene polymer particles containing small quantities of such rubbery diene polymers will absorb the volatile aliphatic hydrocarbon materially faster than will particles of an unmodified styrene polymer. Moreover, the styrene polymer foams prepared from the foamable styrene polymer particles of this invention are more homogeneous and have superior physical properties to styrene polymer foams that are prepared from comparable foamable styrene particles which do not contain a rubbery diene polymer.

The following examples are set forth to illustrate more clearly the principle and practice of this invention to those skilled in the art.

EXAMPLE I

Part A

A polystyrene latex is prepared in which the polymer has a molecular weight of approximately 65,000. The polystyrene is recovered from the latex by drying and is extruded into strands which are ground to a particle size of 8–20 mesh.

Part B

The polystyrene latex of Part A is admixed with a GR–S rubber latex (in which the rubber contains approximately 75% butadiene and 25% styrene) in an amount such that on a solids basis the mixture contains 100 parts of polystyrene and 5 parts of GR–S rubber. The mixed polymer is recovered and ground to 8–20 mesh as described in Part A above.

Part C

The ground polymers of Parts A and B are steeped in n-pentane at 25° C. under agitation for 24 hours. The polymer of Part B absorbs more than twice as much pentane as does the polymer of Part A.

EXAMPLE II

Part A

Six parts of a gel-free GR–S rubber (70% butadiene, 30% styrene) is dissolved in 100 parts of monomeric styrene together with 0.1 part ditertiary butyl peroxide. The resulting solution is polymerized by heating for 14 hours at 75–80° C. and another 14 hours while increasing the temperature from 75° C. to 190° C.

Part B

A polystyrene is prepared as described in Part A above except that no rubber is added to the monomeric styrene.

Part C

The polymers from Parts A and B above are ground to 8–20 mesh and steeped in n-pentane at 25° C. for 24 hours. The polymer from Part A containing the rubbery diene polymer picks up and absorbs pentane at a rate twice as fast as does the unmodified polystyrene of Part B.

The rubbery diene polymer incorporated in the styrene polymer is selected from the group consisting of natural rubber, homopolymers of conjugated 1,3 dienes and interpolymers of conjugated 1,3 dienes containing more than 30 weight percent of said diene and preferably more than 50 weight percent of said diene. The conjugated 1,3 dienes employed in preparing such rubbery diene polymers contain only the elements carbon and hydrogen. The comonomers that may be interpolymerized with such conjugated 1,3 dienes are free of inorganic and other polar substituents and contain only the elements carbon, hydrogen and sometimes oxygen. Examples of such rubbery diene polymers include natural rubber, polybutadiene, synthetic polyisoprene and interpolymers of butadiene with styrene, acrylate esters, methacrylate esters, etc.

The styrene polymers in which the rubbery diene polymers are incorporated are homopolymers of styrene and interpolymers of styrene containing at least 85 weight percent of styrene. Any comonomer interpolymerized with the styrene will be free of inorganic and other polar substituents and will contain only the elements carbon, hydrogen and sometimes oxygen. Examples of such comonomers include butadiene and the acrylate and methacrylate esters. All or a part of the styrene may be replaced with its closely related homologues such as alpha-methylstyrene, vinyl toluene, p-ethylstyrene, 2,4-dimethylstyrene, etc.

Only a small quantity of rubbery diene polymer need be incorporated in the styrene polymer to materially accelerate the rate at which the styrene polymer will absorb the volatile aliphatic hydrocarbon when steeped therein. As little as 1 part rubbery diene polymer in 100 parts of styrene polymer materially accelerates the rate of hydrocarbon absorption and there appears to be little advantage in incorporating more than 20 parts of the rubbery diene polymer in 100 parts of the styrene polymer. It is preferred to incorporate from 3 to 15 parts of rubbery diene polymer in 100 parts of the styrene polymer.

The rubbery diene polymer may be incorporated in the styrene polymer in numerous known manners. The simplest method for preparing the polymer mixture comprises preparing a physical admixture of the rubbery diene polymer and styrene polymer and subjecting the admixed polymers to mechanical work to homogeneously blend them together. Such mechanical working may be carried out on a two-roll rubber mill, in a Banbury mixer, in an extruder or in other types of plastic working apparatuses. Another excellent method of preparing homogeneous mixtures of the rubbery diene polymer and styrene polymer involves preparing the two polymers in latex form, admixing the two latexes in the proper proportions and recovering a homogeneous mixture of polymers from the mixed latex. Another efficient method for preparing the polymer mixtures involves dissolving the rubbery diene polymer in styrene monomer and subsequently polymerizing the styrene monomer.

The volatile aliphatic hydrocarbons employed to steep the particles of the styrene polymer containing the rubbery diene polymer boil within the range of from about 10° C. to about 80° C. and preferably within the range from about 30° C. to about 60° C. Examples of such hydrocarbons include pentane, cyclopentane, heptane, petroleum ethers boiling within the previously described temperature ranges, etc. It is permissible, and in some cases desirable, to admix another volatile organic liquid with the aliphatic hydrocarbon. In particular, good results frequently are obtained employing mixtures of volatile aliphatic hydrocarbons and lower halogenated hydrocarbons such as methylene chloride.

The steeping process employed is conventional except for the added material incorporated in the styrene polymer particles. For an optimum rate of hydrocarbon absorption, the styrene polymer particles should be comminuted to a fine particle size, e. g., less than about 10 mesh. In addition, the rate of hydrocarbon absorption is dependent on the temperature which may range from about 0° C. to the boiling point of the hydrocarbon or even higher if the absorption step is carried out under pressure. At room temperature or above sufficient agitation should be provided to prevent agglomeration of the styrene polymer particles. Where the styrene polymer composition is prepared by a suspension polymerization process, the volatile aliphatic hydrocarbon may be added to the polymerization vessel at the end of the polymerization with continued agitation to prepare the foamable styrene polymer particles.

The above descriptions and particularly the examples are set forth by way of illustration only. Many other modifications and variations thereof can be made without departing from the spirit and scope of the invention herein described.

I claim:

1. The method for preparing foamable particles of a styrene polymer which consists of steeping particles of a styrene polymer composition in a liquid aliphatic hydrocarbon boiling within the range of about 10–80° C.; said styrene polymer composition consisting of 100 parts of a styrene polymer having 1–20 parts of a rubbery diene polymer intimately incorporated throughout the styrene polymer; said styrene polymer being selected from the group consisting of (a) a homopolymer of a monomer selected from the group consisting of styrene, vinyl toluene, p-ethylstyrene and 2,4-dimethylstyrene, (b) an interpolymer consisting solely of at least 2 monomers selected from the group consisting of styrene, alpha-methylstyrene, vinyl toluene, p-ethylstyrene and 2,4-dimethylstyrene, and (c) an interpolymer of at least 85 weight percent of a monomer selected from the group consisting of styrene, alpha-methylstyrene, vinyl toluene, p-ethylstyrene, 2,4-dimethylstyrene and mixtures thereof with up to 15 weight percent of butadiene; said rubbery diene polymer being selected from the group consisting of natural rubber, homopolymers of conjugated 1,3-dienes, and interpolymers of at least 30 weight percent of a conjugated 1,3-diene with up to 70 weight percent of styrene; said particles of the styrene polymer composition having an average particle size of less than about 10 mesh.

2. The method of claim 1 in which 3–15 parts of the rubbery diene polymer are intimately incorporated in 100 parts of a styrene homopolymer.

3. The method of claim 2 in which the rubbery diene polymer incorporated in the styrene homopolymer is an interpolymer of butadiene and styrene.

References Cited in the file of this patent

UNITED STATES PATENTS

| | | |
|---|---|---|
| 2,606,163 | Morris et al. | Aug. 5, 1952 |
| 2,681,321 | Stastny et al. | June 15, 1954 |
| 2,744,291 | Stastny et al. | May 8, 1956 |
| 2,787,809 | Stastny | Apr. 9, 1957 |
| 2,797,443 | Carlson | July 2, 1957 |